Figure 1:
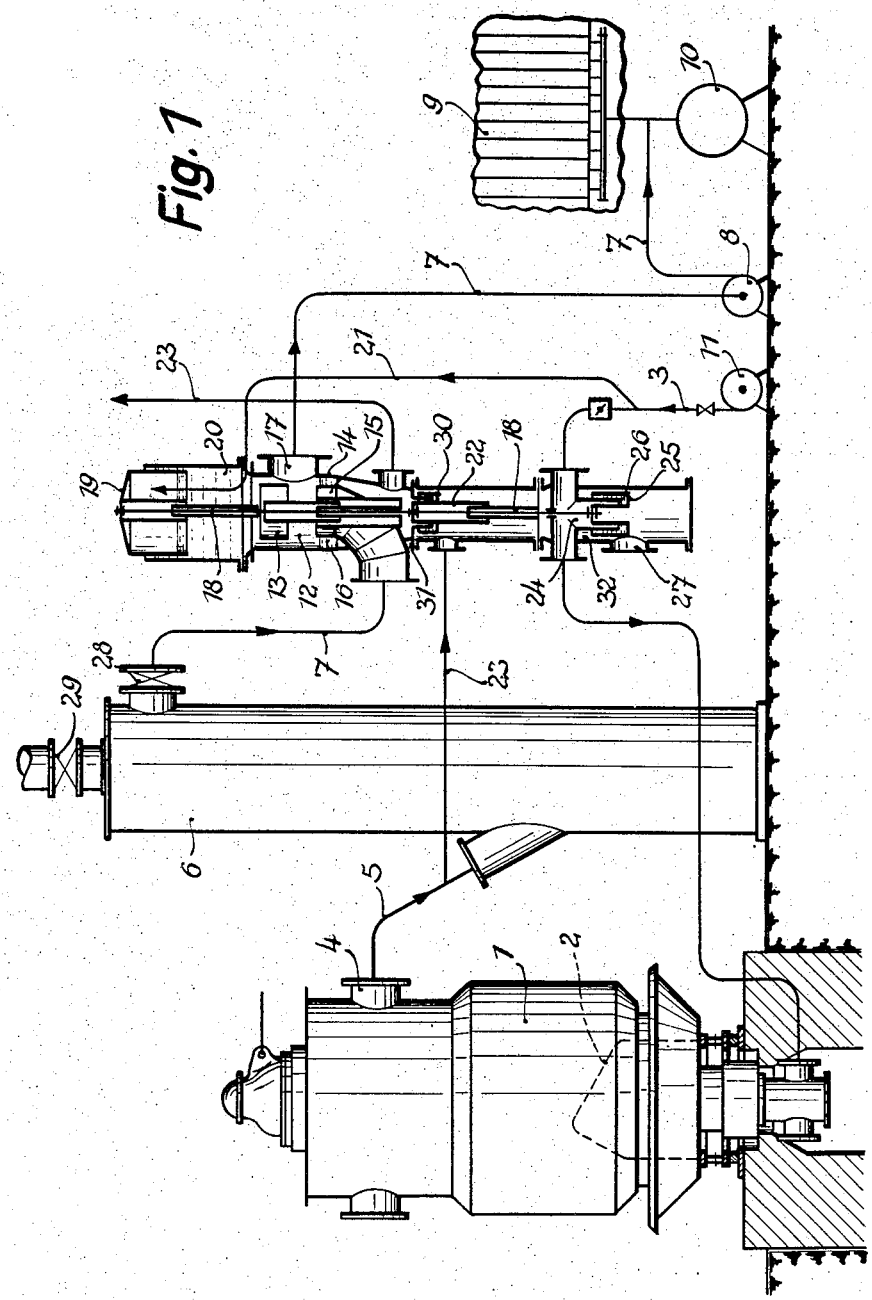

June 1, 1954    P. VAN ACKEREN    2,680,064
SAFETY DEVICES FOR GAS PRODUCERS
Filed March 26, 1951    2 Sheets-Sheet 1

June 1, 1954 P. VAN ACKEREN 2,680,064
SAFETY DEVICES FOR GAS PRODUCERS
Filed March 26, 1951 2 Sheets-Sheet 2

Inventor
Paul van Ackeren
By Thomas J. O'Brien
Atty.

Patented June 1, 1954

2,680,064

UNITED STATES PATENT OFFICE 2,680,064

SAFETY DEVICE FOR GAS PRODUCERS

Paul van Ackeren, Essen, North-Rhine, Germany, assignor, by mesne assignments, to Koppers Company, Inc., Pittsburgh, Pa., a corporation of Delaware Application March 26, 1951, Serial No. 217,591

6 Claims. (Cl. 48—192)

The present invention relates to a safety device for gas producers of the kind comprising a shut-off valve which is kept closed by the forced draught and is located in a by-pass conduit which branches off from the gas conduit and connects the gas conduit with the atmosphere.

A failure or break down of the blower, which supplies the requisite air for gasification to the gas producer, may well entail further disturbances in the whole plant and cause serious damage. For example, if the draught from the gas producer is suspended, the gas in the gas holder tends to flow back through the producer into the draught or air pipe where it may lead to the dangerous formation of explosive mixtures.

In order to avoid this risk it is necessary to utilize the buoyancy in the producer for the suction of air from outside. In order to achieve this purpose the following measures have to be taken: firstly, communication must be established between the gas conduit and the external air, this communication being obtained by the by-pass conduit. Thereupon the individual gas producers must be shut off from the main gas conduit and, finally, it is necessary to establish direct communication between the atmosphere and the draught pipe in order that air may be sucked into the producer.

If an explosion is to be avoided, the foregoing steps must be performed quickly and in accordance with a definite and accurate plan. In the case where a safety device of this kind is manually operated, everything therefore depends on the reliability and skill of the operator.

The present invention provides an arrangement whereby, in the event of a failure to operate on the part of the blower, the necessary safety measures are taken automatically.

For this purpose, the safety device according to the invention comprises a second shut-off valve, which is arranged in the gas conduit beyond (as seen from the gas producer) the branching-off position of the by-pass conduit and which is kept open by the pressure of the forced draught, in combination with a third valve which is arranged in the draught pipe between the blower and the gas producer and connects the draught pipe with the atmosphere and which is kept closed by the pressure of the forced draught.

According to a further feature of the invention, the said three shut-off valves are operated by a single controlling device actuated by the forced draught pressure.

If the draught pressure from the blower subsides the shut-off and valve reversing devices therefor are operated by said draught pressure actuated controlling device or devices in such a manner that the gas conduit is cut off from the consuming apparatus (e. g. oven) or holder whilst the shut-off valve in the by-pass line is opened as well as the valve in the draught pipe, thus establishing direct communication of the by-pass line and the draught pipe with the atmosphere.

Such a draught pressure actuated controlling device may comprise a bell member which is caused to dip into a sealing liquid under the influence of a drop in the draught pressure. However, instead of employing mechanically operated sealing means of this type it is also possible to include hydraulically operated shut-off valves in the various pipes which are subject to the draught pressure, whereby decrease of draught pressure causes the water level to be raised or lowered thereby opening or closing the respective passages. Finally it is also possible to employ shut-off valves which are hydraulically or pneumatically controlled by water or compressed air existent in the plant independently of the blower, the impulse for valve actuation being, of course, again given by the changing pressure of the draught from the blower.

A further development of the safety device forming the subject of the invention consists in making some of the shut-off valves of piston valve form. In this modification the present invention moreover includes a safety device for a gas producer, comprising a first shut-off valve located in a by-pass connected into the gas outlet conduit of the producer and capable of blocking said by-pass or of opening the same to atmosphere, a second shut-off valve located in the gas conduit beyond the junction with said by-pass therewith, a third shut-off valve located in the air main between the producer grate and the means for supplying air to this grate, this third shut-off valve being adapted normally to allow the passage of air through this main from the supply means but being capable of closing the main to this flow and connecting the grate through the main to atmosphere, and hydraulic means automatically responsive to a failure of the pressure of the air blast to close said shut-off valves, thereby closing the gas route to the take-off main and connecting the producer grate and the producer gas conduit to atmosphere.

Conveniently the pistons of the first and third shut-off valves are arranged coaxially and connected by piston rod means so as to be movable in common by a hydraulic piston and cylinder assembly responsive to the pressure of the air blast.

Another advantageous feature of the invention lies in making the piston valve in the air main adjustable by a nut or the like in relation to this air main to enable the volume of airflow therethrough to be regulated. Such an arrangement obviates the need for a special air control damper for the air blast main.

According to a further feature of the invention the second shut-off valve is provided in the cover of a gas-scrubbing tower to which the gas conduit connects and is adapted, when operated to close the gas take-off from the scrubber, to provide a liquid seal against the gas passage.

This device, moreover, may comprise an upwardly-open container depending from the cover of the tower and having a gas take-off pipe projecting thereinto, this container receiving washing liquid and having a gas inlet in the lower end thereof and a ball valve for closing this inlet under control of a hydraulic piston-cylinder assembly responsive to the pressure of the air blast, whereby the washing liquid will fill said container and co-operate with the take-off pipe to form said liquid seal.

Figure 2:
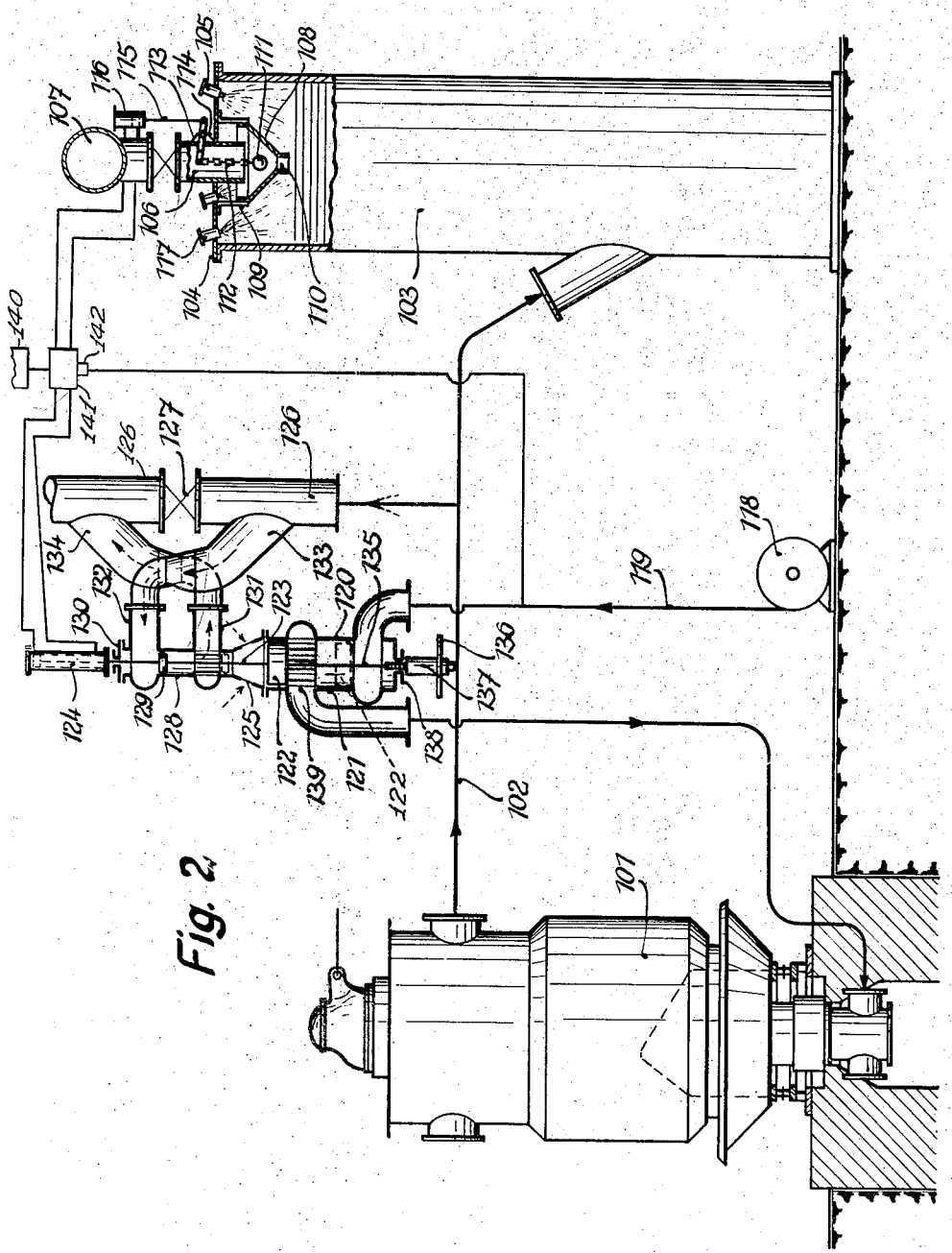

The invention may be understood clearer from the following drawings in which Fig. 1 shows diagrammatically a safety device using sealing bells and Fig. 2 shows another form of the safety device according to the present invention and wherein shut-off valves of the piston-valve type are used.

In Fig. 1 the gas producer is denoted at 1, the grate of the said producer being indicated at 2. Air is fed to the producer grate through the draught pipe 3, whereas the generated gas is exhausted from the upper portion of the producer through an outlet 4 from which it is led through conduit 5 into the scrubber or gas washing plant 6. The blower 8 removes the gas by suction from said gas washing plant 6 through a pipe line 7 into the consuming ovens or other apparatus 9. Also connected to the pipe line 7 is a further gas holder 10 in which any surplus gas can be stored. The forced draught for the producer grate is created by a blower 11.

Fitted in the pipe line 7 is a shut-off valve 12 which comprises a bell plunger 13 and a gas pipe 15 extending into the housing 14. The clear space between the inner walls of said housing 14 and the gas pipe 15 is filled with a sealing liquid, and when the plunger 13 dips into said liquid the passage is effectively sealed. In that case the gas is released from the housing 14 at 17. The plunger 13 is rigidly connected by a rod 18 with a bell member 19, the latter being adapted to be raised and lowered within a housing 20 which is filled with a sealing liquid. A pipe line 21 coming from the draught pipe 3 extends with its open end underneath the space in the bell member 19. Thus said bell member 19 is held in its upper or raised position as shown in the drawing owing to the pressure produced by the blower 11. When the said bell member 19 is in this upper position the gas passage through pipe line 7 is open.

The said rod 18 extends through the whole shut-off valve 12 as well as to a position below this through a further shut-off valve 22, the latter being disposed in the path of a by-pass pipe 23. Said by-pass pipe 23 branches off from the gas conduit 5 at a position in front of the gas-scrubber apparatus 6. The shut-off valve also comprises a sealing cup 30, which is rigidly connected to the rod 18, and a bell plunger 31. As long as the blower is functioning, the shut-off valve 22 remains raised and thus closed, as shown in the drawing. Lastly, there is a further shut-off valve 24 disposed beneath the shut-off valve 22 and lies in the draught pipe 3. Again this shut-off valve 24 comprises a cup-shaped member 25 filled with sealing liquid and rigidly connected with rod 18, cooperating with a hollow cylinder 32 forming an annular plunger adapted to plunge into said sealing fluid in member 25 and rigidly connected to draught pipe line 3. Owing to the draught pressure generated by the blower 11 and acting upon the bell-shaped member 19, the cup 25 is pulled up inside the cylinder 32. The shut-off valve 24 further comprises a connecting pipe 27 disposed below the cup sealing means 25, 26 through which, when the cup 25 is lowered, the atmospheric air can enter the pipe line 3 and thereby be fed to the producer grate 2.

As soon as the draught pressure drops or ceases the bell member 19 sinks and, owing to the rod 18 being connected therewith, the bell plunger 13 follows the downward movement, thereby blocking the passage of gas through pipe line 7. At the same time, however, the shut-off valve 22 is opened, thus connecting line 23 with the atmosphere, finally the rod causes sealing cup 25 to move in a downward direction, thereby permitting the external air to enter the draught pipe line 3 through the connecting pipe 27.

It will be appreciated that each of the shut-off valves 12, 22 and 24 may also be separately connected with the draught-pressure actuated controlling means 19, 20. In that case, instead of the valve 24 being placed in the draught pipe line 3, it is possible for the device 24 to be disposed adjacent to and on the outside of the gas-producer grate in such a manner that, for example, admission of air to the grate is permitted by a butterfly valve or the like when the forced draught has dropped.

After the blower 11 has been repaired and forced draught is again generated thereby, all the shut-off valves 12, 22 and 24 will automatically resume their respective positions as shown in the drawing. It is a fact that after a certain non-productive interval the gas generated in the producer is at first of inferior quality. In order to remove such inferior gas from the comparatively large containers involved, particularly from the scrubbing or washing plant, it is highly recommended to provide a valve 28 at the gas outlet of said washing plant, which valve should first be closed after a fairly long non-productive period whilst a further valve 29 at the top of said washing plant should be opened to let the inferior gas escape into a pipe line which leads into the atmosphere, and, only after the gas producer has resumed efficient production, the valve 29 can be closed and the valve 28 re-opened so that the gas can now freely be fed to the consumer ovens 9 or the like.

In the arrangement shown in Fig. 2 the gas produced by a number of gas producers disposed in a row (one only being actually shown, viz. 101) passes through a conduit indicated by 102 into a tower scrubber 103 where it is agitated by washing liquid from injection nozzles 105 arranged in the cover 104 of the tower. The gas is led off through a pipe 106 in the cover 104 into an off-take main 107 which is common to a plurality of these towers disposed in a row.

Suspended from the cover 104 of the washing tower 103, by means of lugs 109 or the like, is a liquid container 108. The bottom of this container, which is preferably of conical form, as illustrated, has an opening 110 adapted to be closed by a bell valve 111 suspended on a chain 112 which is operable by a lever 113. This lever 113 is mounted at 114 on the conduit 106 and is moved by a rod 115. The rod 115 is connected to a hydraulic piston cylinder assembly 116 having valves in 141 for its inlet and outlet ports which are operable by an air-blast-controlled device 142, all conventional per se in the art of sequence or automatic control mechanisms.

The gas off-take pipe 106 projects to such a depth into the liquid container 108 that, with the container filled with liquid, there is a liquid seal against the passage of gas. This seal is brought into effect when there is a breakdown in the air blower 118 for air blast main 119, the device responsive to the air blast then operating to cause the piston of the mechanism 116 to pull the rod 115 upwards, whereby the ball valve 111 shuts off the opening 110 in the container 108. Washing liquid, which is also supplied continuously through an injection nozzle 117, then fills this container and thereby prevents the passage of gas through pipe 106, thus completely cutting off the flow of gas to the storage or utilisation location, as 9, 10, in Fig. 1.

Subsequently, to keep the gas producer ready for use and yet prevent gas entering the air main 119 it is necessary to introduce further air through the gas producer supply main and carry off the gas produced.

For this purpose a shut-off valve and change-over device 120 is arranged in the air main to the gas producer 101. This device comprises a piston-type valve having a head 122 movable in a cylindrical casing 121 and connected to a piston rod 123 which is adapted to be moved by a hydraulic piston cylinder assembly 124 arranged thereabove. The assembly 124 is controlled, in similar fashion to the piston cylinder assembly 116 for the gas shut-off valve 108, by the pressure of the air blast of line 119. When the piston 122 is located in the position indicated by full lines in Fig. 2 of the drawing the way is open for the passage of primary air from air blower 118 through the air main 119 to the gas producer. If, however, the blower 118 fails, the assembly 124 is automatically controlled so as to bring the piston 122 into the position illustrated in Fig. 2 of dotted outline in the drawing. Under these circumstances the part of line 119 between the device 120 and the producer 101 is connected to atmosphere through openings 125 located above the cylindrical housing 121. Continuing operation of the gas producer will then result from air being drawn in from the atmosphere through this part of the air main 119 and into the producer 101 under natural draft.

The gas produced as a result of this air intake will be drawn off through a by-pass 126 branched from the gas conduit 102 and opening (upwards) to atmosphere. A cut-off valve 127 is arranged in the by-pass conduit 126, and is adapted for manual operation only, remaining closed during automatic running of the plant.

A shut-off valve 128 is provided for automatic blowing-off of the gas. This likewise comprises a cylindrical housing in which a piston head 129 is slidably arranged, such piston valve also being connected to the assembly 124 by the rod 123. The shut-off valve 128 is closed at the top by a cover 130 through which the rod 123 passes, and the casing thereof has pipe connections 131 and 132 branching therefrom and connecting through pipe sections 133 and 134, with the by-pass conduit 126.

In the illustrated position of the piston 129 the gas passage through the by-pass is blocked. If, however, the forced air blast in 119 fails, not only does the piston 122 of the change-over device descend, but the rod 123 pulls down piston 129 into the dotted line position indicated, so that the gas can then pass around valve 127 through conduit 133, pipe 132, cylinder 128, pipe 131 and conduit 134 into the upper part of conduit 126, and thence escape to atmosphere.

The piston 122 of the air reversing device has a rod 135 connected to its lower side, this rod having at its other end a setting nut 137 provided with a hand wheel 136. The nut 137 can be axially adjusted on the threaded end of the rod 135 so as to vary the allowable distance of travel of the rods, 123 and 135 until the adjusting nut 137 strikes a stop 138 in the vicinity of the part where the rod 135 enters the air passage, thus providing a means for adjustment of the stroke of piston 122. In this way the piston 122 can be adjusted in relation to a cylindrical opening 139 above the cylinder 120 and can also thus be utilized for regulating the quantity of primary air normally passing from the blower 118 to the producer 101, thereby avoiding the need for a special air damper in each conduit 119.

The gas off-take pipe 106 from the scrubbers of individual gas producers can be manually closed by operation of a valve in the pressure fluid supply line to the hydraulic assembly 116 concerned. In the same way the supply of pressure medium to the compression cylinder 124 can be manually controlled so as to bring about a blow-off of gas and cutting-out of the blower.

Preferably the hydraulic pressure for operating the piston-cylinder assemblies 116 and 124 is derived from a hydraulic accumulator 140 common to all the pressure-operated devices. This affords a positive and reliable operation of the plant in the event of a breakdown of the air blower, due for instance to a failure in the electrical circuit thereof.

Having now described my invention I declare that it is limited in all its aspects to the examples given but the invention may be variously embodied within the scope of the following claims.

What I claim is:

1. A safety device for gas producers operable under forced draft comprising, the combination with a gas producer, of an air blast conduit connected with the producer, air blast means for forcing an air blast through the air blast conduit into the producer, a gas outlet conduit connected to the producer, a firstb y-pass conduit leading to the atmosphere and connected to the air blast conduit between the air blast means nected to the producer, a first by-pass conduit nected to the gas outlet conduit and leading to the atmosphere, a first shut-off valve for normally closing the first by-pass conduit leading to the atmosphere from the air blast conduit and arranged to be moved, in the event of failure of air blast pressure in the air blast conduit, to a position in which it opens the first by-pass conduit to the atmosphere and closes the part of the air blast conduit, between the connection of the first by-pass conduit therewith and the connection of the air blast means to the air blast conduit, off from the producer and the by-pass conduit, while leaving the part of blast conduit, between the connections thereto of the first bypass conduit and the producer, open to the atmosphere through the first by-pass conduit, a second shut-off valve for normally closing the second by-pass conduit leading to the atmosphere from the gas outlet conduit and arranged to be moved, in the event of failure of air blast pressure in the air blast conduit, to a position in which it opens its second by-pass conduit to the atmosphere, a normally open third shut-off valve for the gas outlet conduit at a region beyond its connection to the second by-pass conduit and arranged to be moved to a position to close off the gas outlet conduit in the event of failure of air blast pressure in the air blast conduit to the producer, means for operating said first valve to open and close said first by-pass conduit, means for operating second valve to open and closed position, means for operating said third valve to open and closed position, fluid pressure operated means operable by separate fluid pressure independent of the air blast pressure in the air blast conduit to the producer, for actuating the means for operating the three valves aforesaid, and means automatically responsive to impulses from changes in air blast pressure in the air blast conduit to the producer, for controlling the separate pressure to said fluid pressure operated means, for operation of the same to actuate the three valves as aforesaid, by and in accordance with the air blast pressure in the air blast conduit to the producer.

2. A safety device for gas producers operable under forced draft comprising, the combination with a gas producer, of an air blast conduit connected with the producer, a gas outlet conduit connected to the producer, air blast means for forcing an air blast through the air blast conduit into the producer, a first by-pass conduit leading to the atmosphere and connected to the air blast conduit between the air blast means and the producer, a second by-pass conduit connected to the gas outlet conduit and leading to the atmosphere, a first shut-off valve in the form of a piston valve comprising a cylindrical housing with a lateral flow connection thereto from the air blast conduit and a piston slidable in the housing in relation to the lateral connection to open and close the housing to flow therethrough, for normally closing the first by-pass conduit leading to the atmosphere from the air blast conduit and arranged to be moved, in the event of failure of air blast pressure in the air blast conduit, to a position in which it opens the first by-pass conduit to the atmosphere and closes the part of the air blast conduit, between the connection of the first by-pass conduit therewith and the connection of the air blast means to the air blast conduit, while leaving the part of blast conduit, between the connections thereto of the first by-pass conduit and the producer, open to the atmosphere through the first by-pass conduit, a second shut-off valve in the form of a piston valve comprising a cylindrical housing with a lateral flow connection thereto from the second by-pass conduit for the gas outlet conduit and a piston slidable in the housing in relation to the lateral connection to open and close the housing to flow therethrough, for normally closing the second by-pass conduit leading to the atmosphere from the gas outlet conduit and arranged to be moved, in the event of failure of air blast pressure in the air blast conduit, to a position in which it opens its second by-pass conduit to the atmosphere, a normally open third shut-off valve for the gas outlet conduit at a region beyond its connection to the second by-pass conduit and arranged to be moved to a position to close off the gas outlet conduit in the event of failure of air blast pressure in the air blast conduit to the producer, means for operating said first valve to open and close said first by-pass conduit, means for operating second valve to open and closed position, means for operating said third valve to open and closed position, hydraulically operated means operable by hydraulic fluid pressure independent of the air blast pressure in the air blast conduit to the producer, for actuating the means for operating the three valves aforesaid, and means automatically responsive to impulses from changes in air blast pressure in the air blast conduit to the producer, for controlling the hydraulic pressure to said hydraulically operated means, for operation of the same to actuate the three valves as aforesaid, by and in accordance with the air blast pressure in the air blast conduit to the producer.

3. Apparatus as claimed in claim 2, and in which the first and second shut-off piston valves are arranged coaxially with their pistons interconnected by piston rod means so as to be movable in common, and in which the hydraulically operated means for operating said pistons comprises a hydraulic piston and cylinder assembly connected to said piston rod means, for moving the pistons in common response to impulses from the changing pressure from the air blast means.

4. Apparatus as claimed in claim 2, and in which the piston of the first shut-off valve is adjustable in relation to the air blast conduit for regulation of the volume of air flowing therethrough in its closed position for closing off the first by-pass conduit.

5. A safety device for gas producers operable under forced draft comprising, the combination with a gas producer, of an air blast conduit connected with the producer, air blast means for forcing an air blast through the air blast conduit to the producer, a first by-pass passage connecting the air blast conduit with the atmosphere and located between the air blast means and the producer, a gas outlet conduit connected to the producer, a second by-pass conduit connecting the gas outlet with the atmosphere, a scrubber having a cover provided with a gas take-off connected with the gas outlet conduit at a region beyond the region at which the second by-pass conduit connects with the gas outlet conduit, a first shut-off valve in the form of a piston valve comprising a cylindrical housing with a lateral flow connection thereto from the air blast conduit and a piston slidable in the housing in relation to the lateral connection, to open and close the housing to flow therethrough, for normally closing the first by-pass passage for the air blast conduit to the producer and arranged to normally allow passage of air from the air blast means through the air blast conduit to the producer during the normal position of the first valve for closing its by-pass passage to the atmosphere, and to close off the part of the blast conduit leading from the by-pass passage to the air blast means while leaving another part of the blast conduit, leading from the by-pass passage to the producer open to the atmosphere through the by-pass passage, during the open position of the first valve for opening the first by-pass passage to the atmosphere, a second shut-off valve in the form of a piston valve comprising a cylindrical housing with a lateral flow connection thereto from the second by-pass conduit for the gas outlet conduit and a piston slidable in the housing in relation to the lateral connection to open and close the housing to flow therethrough, for normally closing the second by-pass conduit for the gas outlet conduit, a normally open third shut-off valve in the form of a liquid sealed valve in the cover of the scrubber having means for introducing liquid to the valve to provide a liquid seal against the passage of gas, for closing the gas outlet conduit at a region beyond the second by-pass conduit, means operable by the pressure of the forced draft for the producer for normally holding said first valve closed and operable on failure of said pressure to open said first valve, means operable by the pressure of the forced draft for the producer for normally holding said second valve closed and operable on failure of said pressure to open said second valve, and means operable by the pressure of the forced draft for the producer for normally holding said third valve open and operable on failure of said pressure to close said third valve, said means operable by the pressure of the forced draft for the producer for opening and closing the three valves comprising hydraulically operable means automatically responsive to the pressure of the forced draft.

6. Apparatus as claimed in claim 5, and in which the third shut-off valve comprises an upwardly open container depending from the cover of the scrubber and having an upper gas offtake pipe projecting therein and a lower gas inlet thereto, a ball for closing the lower inlet, means for introducing washing liquid into the container for cooperation with the projecting pipe to form the liquid seal, and a hydraulic piston cylinder assembly connected to said ball and to be responsive to the pressure of the air blast, for opening and closing the ball of the third valve.

No references cited.